(12) United States Patent
Dorsel et al.

(10) Patent No.: US 6,426,836 B2
(45) Date of Patent: Jul. 30, 2002

(54) METHOD AND APPARATUS FOR REDUCING THE FORMATION OF SPOTS IN LASER PROJECTION

(75) Inventors: Andreas Dorsel, Menlo Park, CA (US); Frank Diedrich, Germering (DE)

(73) Assignee: Hewlett-Packard Co., Palo Alto, CA (US)

( * ) Notice: Subject to any disclaimer, the term of this patent is extended or adjusted under 35 U.S.C. 154(b) by 80 days.

(21) Appl. No.: 09/773,399

(22) Filed: Jan. 31, 2001

Related U.S. Application Data

(63) Continuation of application No. 08/933,185, filed on Sep. 18, 1997, now abandoned, which is a continuation of application No. 08/873,209, filed on Jun. 11, 1997, now Pat. No. 6,092,900.

(30) Foreign Application Priority Data

Jun. 11, 1996 (DE) .......................................... 196 23 179

(51) Int. Cl.$^7$ ........................... G03B 21/56; G02B 26/02
(52) U.S. Cl. ........................ 359/443; 359/449; 359/228
(58) Field of Search ................................ 359/443, 452, 359/453, 449, 446, 460, 458, 442, 599, 228

(56) References Cited

U.S. PATENT DOCUMENTS

| | | | | |
|---|---|---|---|---|
| 2,287,556 A | * | 6/1942 | Land | 359/452 |
| 3,650,608 A | * | 3/1972 | Baker | 359/460 |
| 4,140,369 A | * | 2/1979 | Howland | 359/352 |
| 4,143,472 A | * | 3/1979 | Murata et al. | 434/409 |
| 4,143,943 A | * | 3/1979 | Rawson | 359/446 |
| 4,184,762 A | * | 1/1980 | Guzman | 359/456 |
| 4,401,368 A | * | 8/1983 | Dreschel et al. | 359/452 |
| 4,666,248 A | * | 5/1987 | Van De Ven | 359/457 |
| 5,192,197 A | * | 3/1993 | Culp | 417/322 |
| 5,270,752 A | * | 12/1993 | Kataoka et al. | 353/28 |
| 5,361,163 A | * | 11/1994 | Matsuda et al. | 359/452 |
| 5,416,617 A | * | 5/1995 | Loiseaux et al. | 359/452 |
| 5,485,308 A | * | 1/1996 | Hirata et al. | 359/460 |
| 6,092,900 A | * | 7/2000 | Diedrich et al. | 359/446 |

\* cited by examiner

Primary Examiner—Christopher E. Mahoney

(57) ABSTRACT

A projection surface includes scattering microparticles that are in constant motion in relation to each other and to a source of laser radiation in a laser projection system. The microparticles reduce the formation of spots that normally occur when viewing the contents of images which are uniformly illuminated by means of laser projection and which are reflected off a projection surface. The microparticles are reflective in a suspension fluid and move due to Brownian molecular motion. A mirror is placed on the back wall of the screen so that the viewer sees both the backscattered light from the incident beam as well as the forward scattered light from the reflected beam. A cellular structure is located in the suspension fluid to laterally confine the scattered light increasing the sharpness of the laser light seen by the viewer.

20 Claims, 4 Drawing Sheets

METHOD AND APPARATUS FOR REDUCING THE FORMATION OF SPOTS IN LASER PROJECTION

This application is a continuation of Ser. No. 08/933,185, filed Sep. 18, 1997, now abandoned, which is a continuation of Ser. No. 08/873,209, filed Jun. 11, 1997 now U.S. Pat. No. 6,092,900.

BACKGROUND OF THE INVENTION

This invention relates to a system for improving the image brightness and image sharpness in laser television projection systems.

Laser projection uses a raster procedure to produce images. In the raster procedure, three primary colors red, green, and blue are emitted from one laser or from two or more different lasers. The three colors are modulated separately, brought together again, and scanned over a surface. The image is then formed by points, as in the standard television picture tube. The color of an image point is defined by the relative power of its primary color components. Normally the beam is deflected horizontally by a polygonal mirror and vertically by a galvanometric scanner.

The laser beam causes image irregularities (spots) or so-called speckles in the laser image projection due to the spatial coherence of the laser light. The effect can be observed by shining a diverged laser beam onto a wall. The eye of a viewer sees a disk with a stochastic light-dark distribution, instead of a uniformly illuminated field.

The spots are perceived when light is reflected off a projection surface and to the eye. The projection surface has areas which are uneven compared with the size of the light source wavelength. The light waves reflected off these uneven surface areas of the projection surface reach the eye with different phase positions creating interference that is perceived in the eye. From a given standpoint of the observer, this interference produces a spatial two-dimensional light-dark pattern.

A laser projection system is described in European Patent No. EP0589179A1 where laser radiation consisting of three primary colors is passed through a diffusion element in a common optical path. The diffusion element rotates in the range from 30 to 40 rpm to prevent the formation of spots due to interference phenomena and creates a clearer, truer-color image.

A projection light image display system with reduced spot formation is also described in European Patent No. EP0385706. A coherent light source is used to produce a light beam. A light modulator directs the light from the source onto the display screen reproducing an image. The screen is coupled with a transducer that creates acoustic surface waves in the screen where the image is reproduced. The acoustic waves possess an amplitude which is greater than the wavelength of the light beam. The surface waves are supposed to prevent the formation of spots when viewing uniform image contents taking advantage of the fact that the eye is not quick enough to perceive the moving interference pattern created by the surface waves.

A system is also described in U.S. Pat. No. 5,313,479, in which a rotating diffusion element is arranged in the optical path of the laser. The diffusion element moves the interference pattern so quickly that it cannot be perceived by the human eye.

The systems described above require mechanical transducers and, therefore, are relatively expensive. The diffusion elements mentioned above also induce lateral diffusion of photons in the screen which reduce image sharpness and brightness. If the reflectivity of a laser projection screen is low, more powerful lasers are needed which are more costly, require more power and cooling and have a shorter operating life.

Thus, a need exists for reducing interference in light image display systems while at the same time maintaining high image sharpness and brightness.

SUMMARY OF THE INVENTION

A projection surface reduces the formation of spots during laser projection while increasing the sharpness and brightness of the laser projection after being scattered by the screen. The projection surface includes scattering microparticles that are in constant motion relative to each other and a source of laser radiation of the laser projection. The microparticles reduce the formation of spots that normally occurs when viewing the contents of images which are uniformly illuminated by means of laser projection and which are reflected off a projection surface.

The projection surface is made in such a way that although the image irregularities (spots) or speckles still occur, they are variable in time so that the two-dimensional light-dark pattern, when seen over the reaction time of the eye, is averaged out. Thus, the viewer perceives a uniform brightness.

In one embodiment of the invention, the microparticles are formed in a suspension fluid. Due to Brownian molecular motion in the fluid, the microparticles continue to move. The fluid may be warmed to further increase motion of the microparticles. In another embodiment of the invention, a piezoelectric force is used to further increase motion by causing turbulence in the microparticles. It is also advantageous to constantly mix the particles to prevent settling. Both embodiments are relatively simple and are resistant to interference.

In place of a solid projection wall, the projection surface has mobile scattering centers. These scattering centers are implemented by suspending the microparticles in the fluid. The motion of the microparticles creates a large number of different light/dark patterns during illumination by the laser spot. The eye perceives the patterns as a uniform image for uniform image contents.

In another embodiment of the invention, the back wall of the screen is made reflective. The incident laser beam passes through a front window and through the suspension fluid that backscatters the light to remove stationary speckle. The light is also reflected back after hitting the back mirror. The viewer sees both the backscattered light from the incident beam as well as the forward scattered light from the reflected beam. The reflected light gives rise to further scatter and thus adds to image brightness.

In another embodiment of the invention, a cellular structure is located in the suspension fluid. The cellular structure laterally confines light increasing the sharpness of the laser light seen by the viewer. The cells can be different shapes such as, honeycomb shaped or square shaped. Different absorbing, scattering or reflective surfaces can be used on the sides of the cellular structure in contact with the suspension medium according to the desired brightness and sharpness of the laser projection.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 1b shows a schematic longitudinal sectional view of the laser projection arrangement shown in FIG. 1a.

FIG. 2 is a schematic longitudinal sectional view of a mirror added to the laser projection arrangement shown in FIG. 1a.

DETAILED DESCRIPTION

Figure 1A:
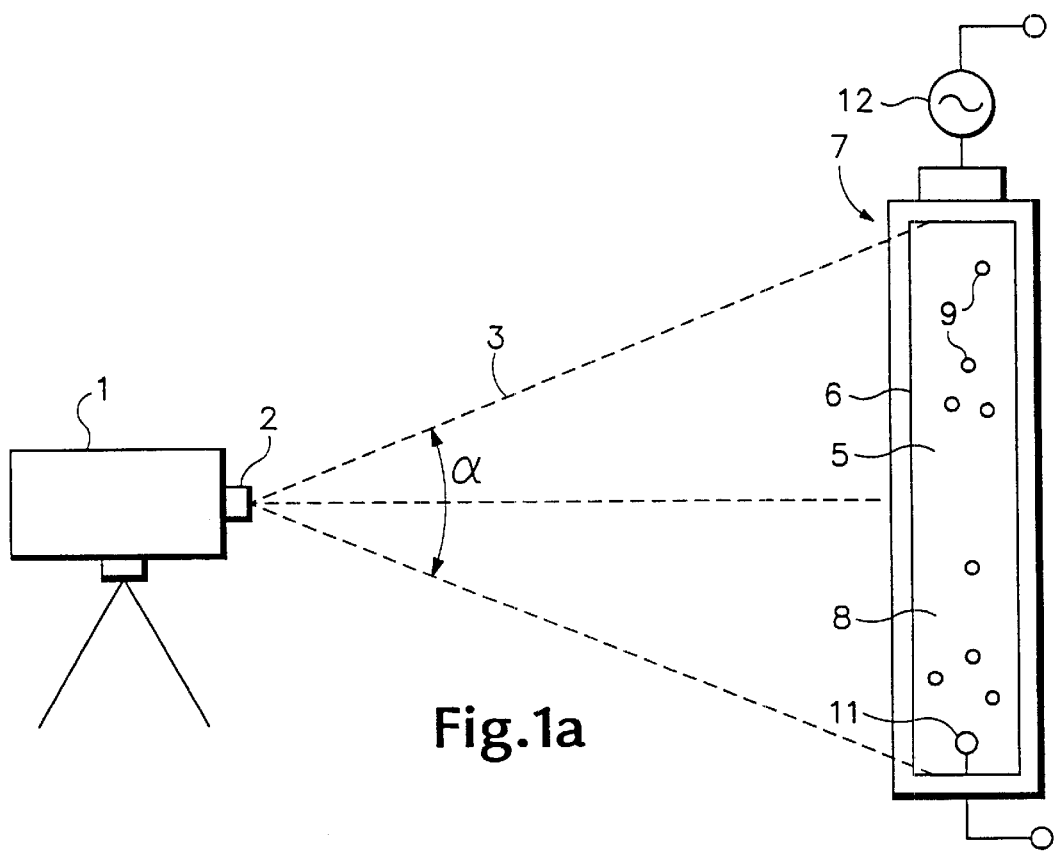
FIG. 1a shows a schematic top view of a laser projection arrangement with a fluid projection surface according to the invention.
Figure 1B:
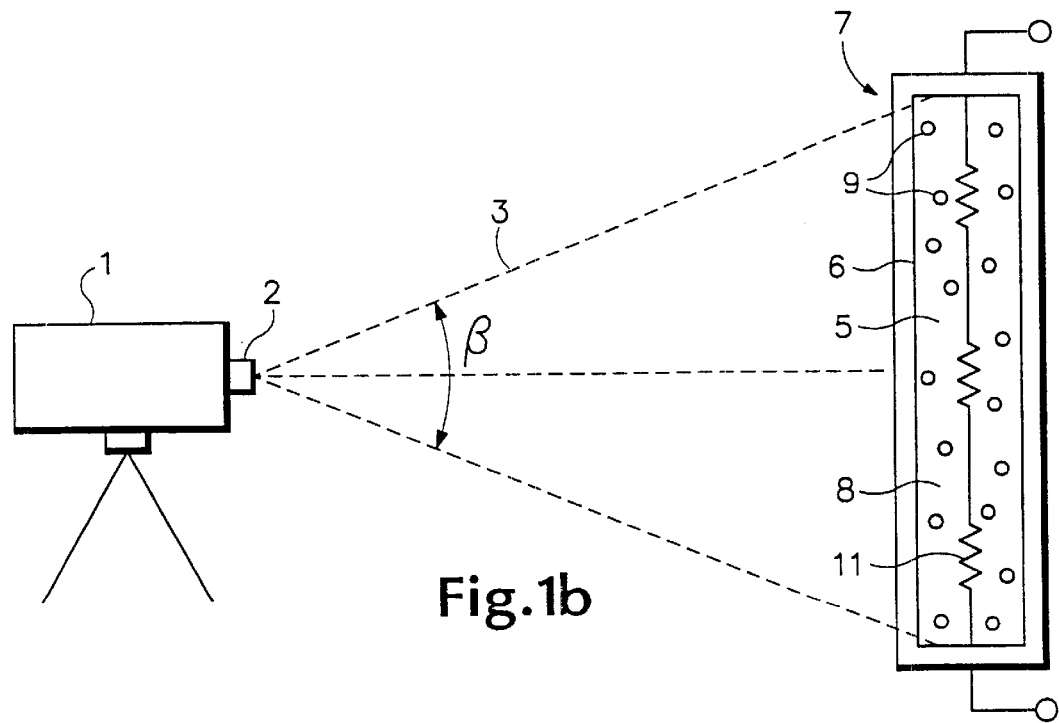

Referring to FIGS. 1a and 1b, the laser projection system according to the invention includes a projection device 1 that has three coherent sources of radiation beam 3 for the primary colors red, blue, and green in the form of lasers, as is described in U.S. Pat. No. 5,313,479 to Florence. The laser radiation beam 3 exits the projection device 1 through an exit opening 2 and strikes a projection surface 5. The laser radiation beam 3 is deflected in the azimuth range of angle α by means of a polygonal mirror guided around a vertical axis (not shown), and in height in the range of angle β by galvanometric scanners (not shown).

The azimuth angle α is typically within the range of 30–90 degrees and the height angle β is typically in the range of 25–50 degrees. Means of varying the azimuth angle and height angle using polygonal mirrors and galvanometric scanners, respectively, are known to those skilled in the art and are, therefore, not described in detail.

The projection surface 5 is provided within a housing 7. A transmitting boundary surface 6 resides on a side facing the projection device radiation source. The transmitting boundary surface 6 and housing 7 are shown schematically and contain a suspension fluid 8 with light scattering particles 9. The scattering particles 9 scatter the laser beam 3 entering through the boundary surface 6. The motion of the particles 9 prevents the formation of an interference pattern. The path length changes due to the motion of particles 9 are greater than the wavelength of the reflected light. Thus, the eye of a viewer does not perceive changes in brightness of the scattered laser beam 3.

The largest average diameter of the particles 9 is on the order of 100 μm or less down to the order of nanometers. Due to Brownian motion, the suspension fluid 8 constantly moves at room temperature sufficiently to prevent interference patterns. An alternative embodiment, heats suspension fluid 8 with additional heating resistors 11 to increase the Brownian motion and to further reduce spot formation in the eye of the viewer when viewing the projection surface 5.

The motion of the particles 9 in the suspension fluid 8 is also increased by using piezo oscillators 12 acting on one or several membrane that each comprise scattering particles in a suspension material. The piezo oscillators 12 force even mixing of the scattering particles in the suspension fluid. The deflection path of the particles 9 caused by the effect of the piezoelectric force is also above the wavelength of the reflected laser light 3.

FIGS. 1a and 1b show the projection surface 5 in a top sectional view and a longitudinal sectional view, respectively. The longitudinal sectional view in FIG. 1b shows a projection surface suitable for motion picture/television or video purposes. The projection housing of the laser projection device 1 should ideally be located not too far above the height of the viewer so the scattered light is headed toward the eyes of the viewer. The radiation from laser light 3 passes through the transmitting boundary surface 6 and is reflected by the projection surface 5 made up of light scattering particles 9. The layer of suspension fluid 8 can be different thicknesses. However, a thickness between 0.1 centimeters and 2.0 centimeters provides sufficient scattering and also reduced weight.

One embodiment of the invention uses milk as the projection surface 5. The milk contains coagulated protein and fat particles 9 suspended in water 8. The milk is illuminated by the laser radiation 3. A spot observed on the surface of the milk produces more uniform brightness compared with the same laser spot when shone onto solid cardboard.

The medium causing the required back-scatter could be a suspension of glass spheres of very small particles such as aluminum oxide particles or silicon oxide particles suspended in, e.g., water or oil. The suspension material 8 can alternatively be a gas or any alternative material that can evenly suspend scattering particles. Mechanical and electronic devices, other than the piezoelectric transducer 12, can be used to keep the scattering particles 9 evenly mixed in the suspension material 8.

The scatter length over which all but a fraction of the incoming laser beam 3 is scattered should not be large compared to the depth of the cell in order to have good power efficiency. This is controlled by particle concentration in the suspension material 8 or by choosing the cell depth accordingly. The function of the liquid 8 is to move the particles sufficiently by diffusion over the retinal integration time. Also, it is advantageous to make the scatter length comparable to or smaller than the desired lateral resolution so that photon diffusion, as opposed to particle diffusion, does not cause image blur. The angular distribution of scattered light is optimized by controlling the shape and size (distribution) of the scattering particles 9. The refractive index/indices of the different media making up the emulsion/suspension material can also be varied to optimize the angular distribution of the scattered light.

Figure 2:
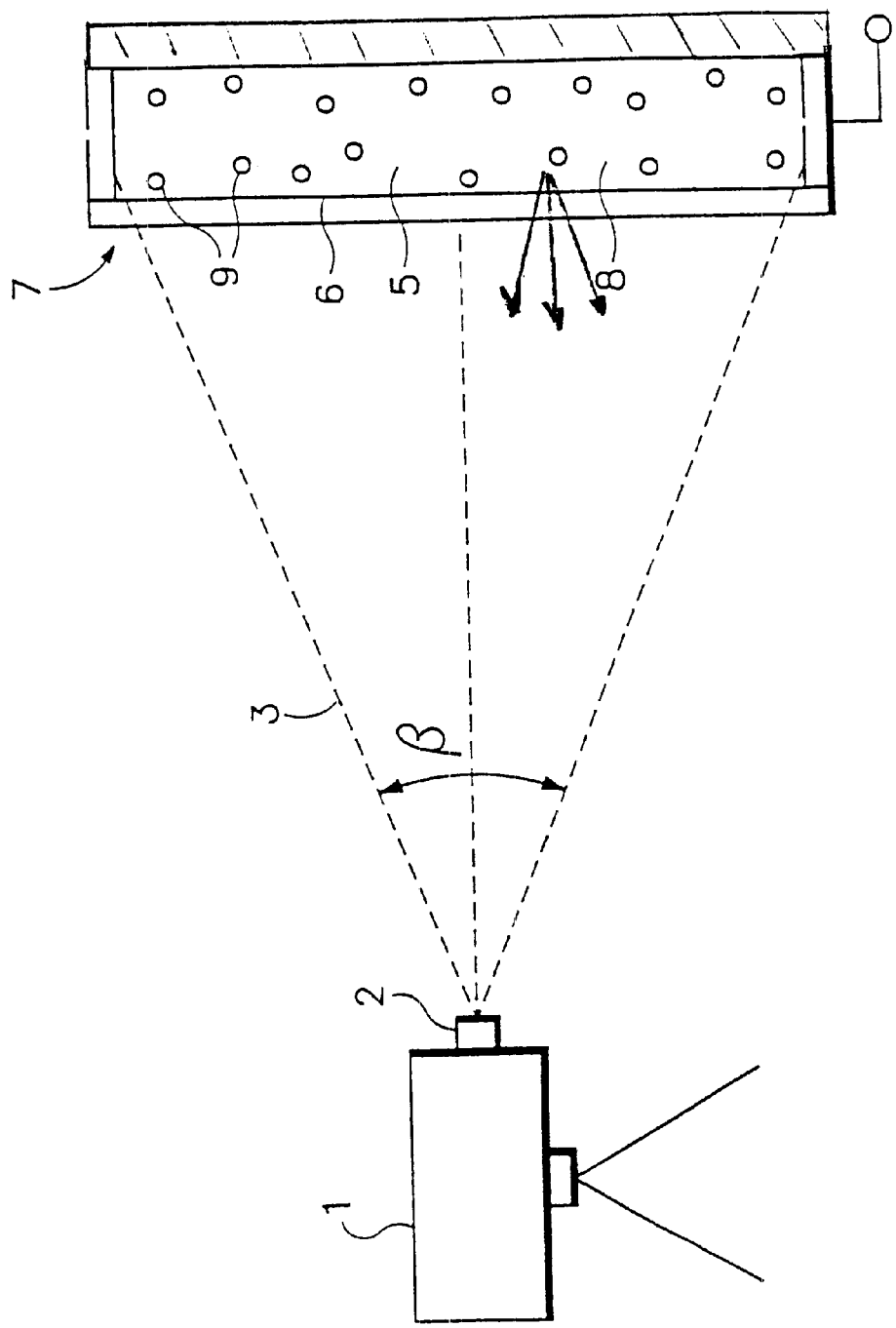

Another embodiment of the invention is shown in FIG. 2. A screen housing 7 includes a front glass window 16 and a mirrored surface 14 located on a back substrate 15. The incident laser beam 3 passes through the front window 16 and into the suspension material 8. The suspension material 8 backscatters the laser beam light reducing stationary speckle. The laser beam 3 is also reflected by the mirror 14, giving rise to further scatter that increases the brightness of the laser light image. Thus, when illuminated and viewed from a front side, the reflective mirror 14 on the back side of the housing 7 allows a person viewing the projection surface 5 to see both the backscattered light 19 from the incident laser beam 3 as well as forward scattered light 18 from the laser beam 3 reflected off the mirror 14.

The amount of reflectivity of the back mirror 14 can be varied according to the desired brightness of the laser light image visually observed on the front boundary surface 6. For example, a less reflective material will reduce brightness and a more reflective material will increase brightness.

Figure 3:
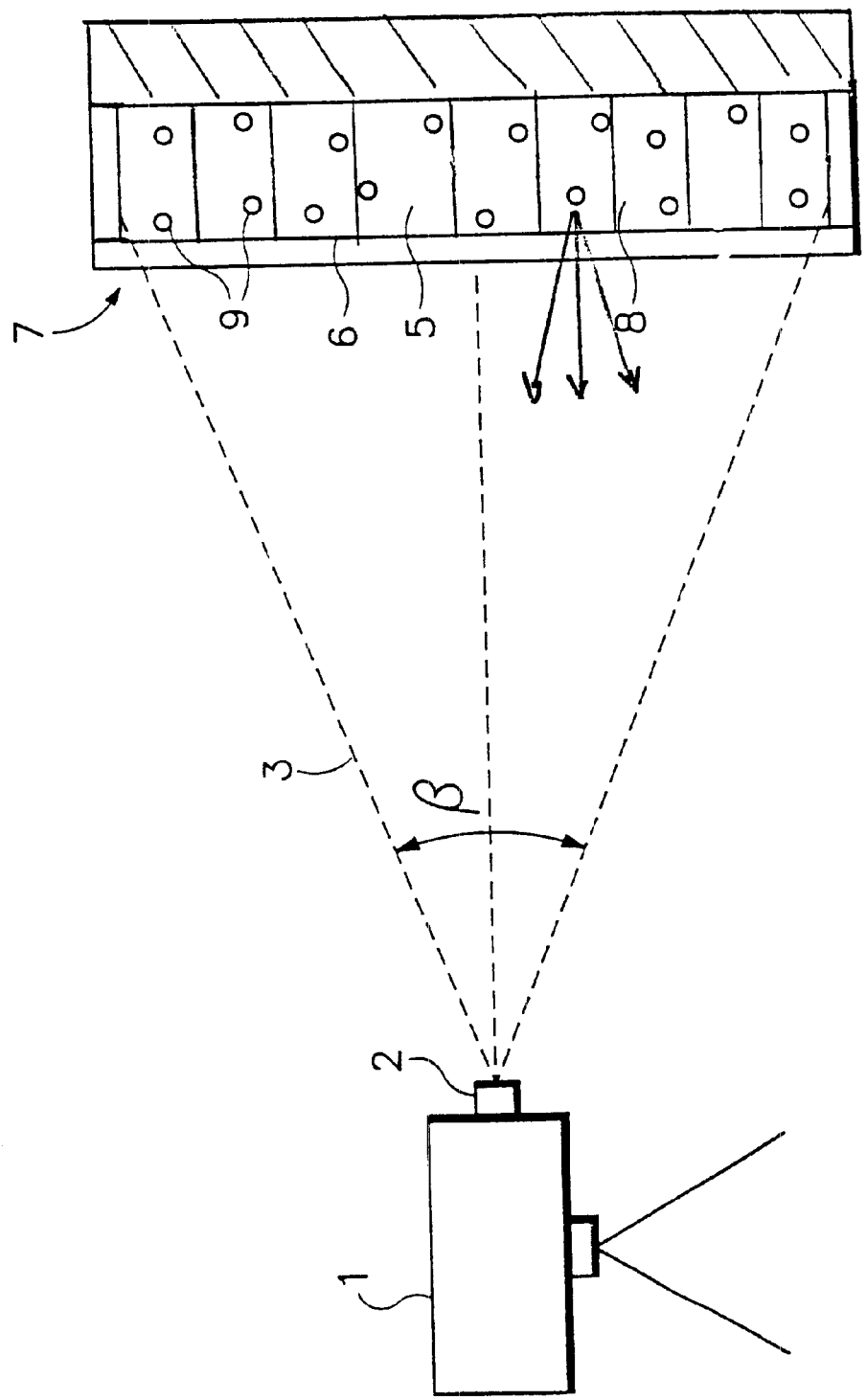
FIG. 3 is a schematic longitudinal sectional view of a cellular structure added to the laser projection arrangement shown in FIG. 2.

Another embodiment of the invention is shown in FIG. 3. A cellular structure 20 is located in the suspension material 8 between the front glass 16 and the rear mirror 14. The multi-cell structure 20 is bonded between the glass 16 and the mirror 14 with an adhesive. Alternatively, the multi-cell structure 20 is located in a housing 7 similar to that shown in FIGS. 1A and 1B that does not include a back mirror 14.

Figure 4:
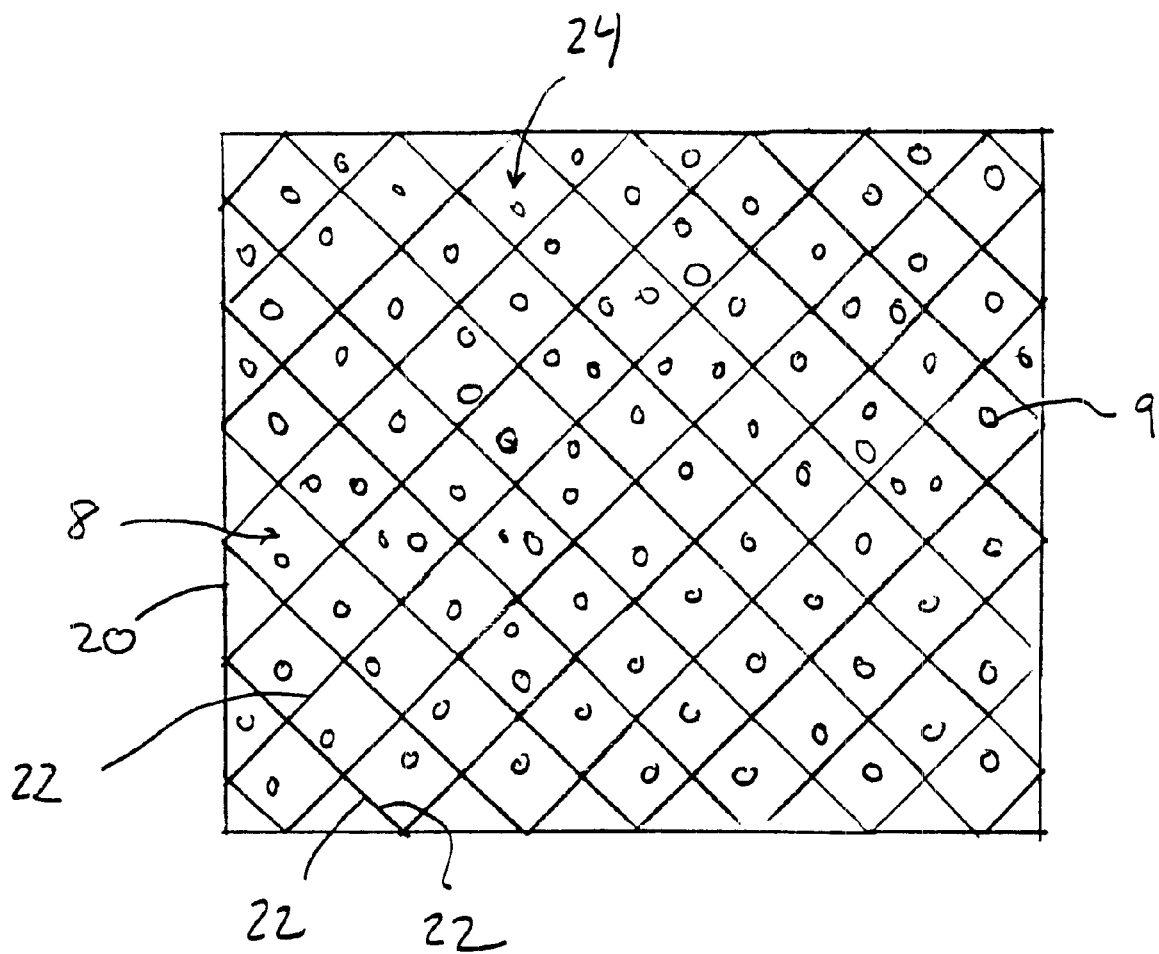
FIG. 4 is a schematic front view of the cellular structure shown in FIG. 3.

FIG. 4 is an enlarged schematic diagram of a square cellular structure 20. The individual cells 24 are formed by the cellular structure 20 and each retain some of the scattering particles 9. The cellular structure 20 confines lateral scattering of the incident laser light 19 to individual cells 24 improving sharpness of the viewed laser light image. The diameter of each individual cell 24 is preferably the same or smaller than the diameter of the individual pixels displayed on the projection surface 5. This prevents the laser light 3 from different pixels from bleeding into each other without having to align the cellular structure 20 with the display locations of the individual pixels.

The cellular structure 20 has either absorbing, scattering or reflective sides 22 that contact with the suspension material 8. For example, the sides 22 are black for light absorption or an aluminum or silver color for higher reflectivity. The cellular structure 20 can be made out of a variety of materials such as plastic, metal, synthetic resin or a fibrous sheet. The cellular structure 20 can be different shapes, such as the square shape shown in FIG. 4, a honeycomb shape, a circular shape or any shape preferable in a particular application.

Cellular structures similar to cellular structure 20 are used in the drawing toy "Magna Doodle" produced by Tyco Industries, Mt. Laurel, N.J. 08054, and is described is U.S. Pat. No. 4,143,472.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A projection surface for reducing interference patterns perceived in a laser light image transmitted from a laser radiation source in a laser projection system, comprising:

a suspension material that includes multiple light scattering microparticles constantly in motion relative to each other and to the laser radiation source of the laser projection system, the suspension material while scattering the laser light image varying the interference patterns in time thereby preventing perception of the interference patterns; and a mirror located adjacent to the suspension material reflecting back the laser light passing through the suspension material thereby increasing laser light image brightness.

2. A projection surface according to claim 1 including a cellular structure located in the suspension material.

3. A projection surface according to claim 2 wherein the cellular structure comprises a plurality of honeycomb cells or square cells.

4. A projection surface according to claim 2 wherein the cells in the cellular structure each have a width less than a diameter for individual pixels of the laser light image transmitted onto the projection surface such that the laser light from different pixels is prevented from bleeding into each other without having to align the cellular structure.

5. A projection surface according to claim 2 wherein the cellular structure is made of a metal, plastic, synthetic resin or fibrous sheet.

6. A projection surface according to claim 2 wherein the cellular structure includes sides that primarily reflect light.

7. A projection surface according to claim 2 wherein the cellular structure includes sides comprising mirrors.

8. A projection surface according to claim 2 wherein the cellular structure includes sides that primarily absorb light.

9. A projection surface according to claim 2 wherein the suspension material comprises a coagulated protein.

10. A projection surface according to claim 1 wherein the suspension material comprises a fluid and a constant motion of the microparticles is produced by Brownian motion.

11. A projection system, comprising:

a projection device transmitting images with a light source;

a projection screen including scattering microparticles suspended in a suspension material and moving in relation to the light source, the microparticles deflecting light from the transmitted images thereby reducing perceived phase interference; and a cellular structure located in the suspension material for confining lateral deflection of the light thereby increasing the sharpness of the transmitted images on the projection screen.

12. A projection system according to claim 11 wherein the projection screen includes a mirror located in back of the suspension material that reflects back the light passing through the suspension material.

13. A projection system according to claim 11 wherein the suspension material comprises a coagulated protein.

14. A projection system according to claim 11 wherein width of the cells in the cellular structure is smaller than a diameter of individual pixels of the images transmitted onto the projection screen such that the laser light from different pixels is prevented from bleeding into each other without having to align the cellular structure.

15. A method for projecting images with a laser light source onto a projection screen, comprising:

suspending light scattering microparticles in a projection screen suspension material;

moving the microparticles in relation to each other and the laser light source;

deflecting the laser light off of the scattering microparticles in the projection screen for reducing perceived phase interference in the laser light;

reflecting back the deflected laser light from a back side of the projection screen to increase the brightness of the deflected laser light; and laterally confining the deflected laser light confining the microparticles in multiple cells in the projection screen.

16. A method according to claim 15 including increasing the movement of the microparticles by heating the projection screen.

17. A method according to claim 15 including increasing the movement of the microparticles by applying a piezoelectric force or other mixing mechanism to the projection screen.

18. A method for projecting images with a laser light source onto a projection screen, comprising:

suspending light scattering microparticles in a projection screen suspension material;

moving the microparticles in relation to each other and the laser light source;

deflecting the laser light off of the scattering microparticles in the projection screen for reducing perceived phase interference in the laser light; and reflecting back the deflected laser light from a back side of the projection screen to increase the brightness of the deflected laser light or laterally confining the deflected laser light confining the microparticles in multiple cells in the projection screen.

19. A method according to claim 18 including increasing the movement of the microparticles by heating the projection screen.

20. A method according to claim 18 including increasing the movement of the microparticles by applying a piezoelectric force or other mixing mechanism to the projection screen.

* * * * *